Oct. 18, 1932.   C. M. NICHOLSON ET AL   1,882,865
HOOK RULE
Filed May 1, 1931
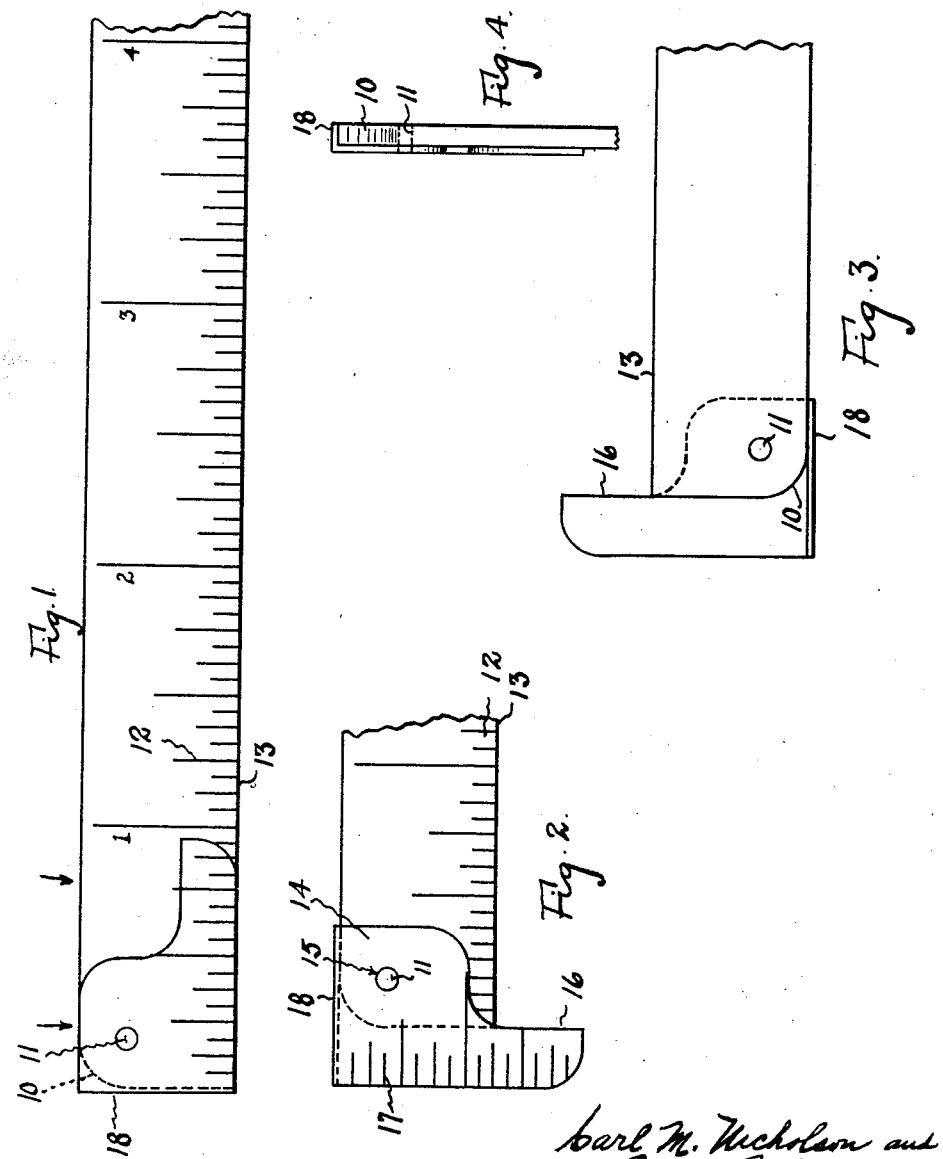

Patented Oct. 18, 1932

1,882,865

UNITED STATES PATENT OFFICE

CARL M. NICHOLSON, OF OSSINING, AND EMIL ANDERSON, OF BRIARCLIFFE, NEW YORK, ASSIGNORS TO MASTER RULE MFG. CO., INC., OF NEW YORK, N. Y., A CORPORATION OF NEW YORK

HOOK RULE

Application filed May 1, 1931. Serial No. 534,262.

This invention relates to improvements in hook rules and has for its object the provision of a simple construction which is efficient in operation and economical to manufacture.

A further object is the provision of a rule having a foldable hook member which is so constructed and disposed as to be readily opened and closed and which forms the tip end of the rule when said member is closed and the hook end when the same is open.

A further object of the invention includes the provision of an end flange on the hook member. Said flange is so constructed as to abut against an extended surface of the rule member when the hook member is open and whereby the hook member is firmly held at the proper angle in open position. The hook member is further provided with rule marks or graduations on its outer edge and said hook member is so mounted on or near the end of the rule that the said marks or graduations will coincide with the marks or graduations on the rule member when the hook member is folded. In its folded position, therefore, the hook member will protect the end of the rule against injury or wear due to use.

Other objects will appear hereinafter and I attain these objects by the construction shown in the accompanying drawing, in which Figure 1 is a plan view of a portion of a rule which is provided with a foldable hook member in accordance with the principles of our invention, said foldable member is shown in folded position;

Fig. 2 is a view similar to that of Fig. 1 with the hook member in open position;

Fig. 3 is a view taken on the reverse side of Fig. 2; and

Fig. 4 is an edge view of the hook end of the member viewed in the direction of the arrows on Fig. 1.

The invention may be applied to an end of a rule which may be a foldable or extension rule, or other type of measuring instrument. As shown in Fig. 1 the end of the rule member to which the hook member is attached is rounded at 10 so as to provide for the turning of the hook member on a pivot 11. This pivot is located near the end of the rule member and on one side of the median line of the rule member. The rounded portion 10 is cut on an arc struck from the pivot point 11 so as to provide free room for the movement of the hook member in opening and closing. The usual rule markings or graduations 12 are formed on the rule member at the inner edge 13 of said rule member. The hook member is provided with a body portion 14 which is provided with a hole 15 for receiving the pivot pin 11 when the hook member is assembled. The body portion is wide enough to act as a bearing surface and as an extension beak or fingerlike projection 16. The outer edge of the finger-like projection is provided with rule markings 17 which coincide with the markings on the inner edge of the rule member when the hook member is in closed position.

The hook member is provided further with a flange 18. This flange forms the ends of said hook member and serves for the purpose of a stop medium. When the hook member is opened the flange abuts against an extended edge of the rule member so as to form a firm support for the hook member which is then in alignment with the end of the rule so as to form a surface against which the object to be measured may be engaged. The flange and body portion of the hook member further serves as an end piece for the rule to thus protect the rule against wear and injury. This provision will save the necessity of providing the usual metal tip for the rule inasmuch as the hook member performs the function of the metal tip. The construction is simple and the hook member as assembled on the end of the rule is easily opened and closed and is substantial so that it will not readily get out of alignment and may be quickly opened or closed when it is used.

While we have described a specific form of construction which discloses the principles of our invention it will be obvious to those versed in the art that equivalents thereof may be readily devised which equivalents, however, are intended to be incorporated in our invention as defined in the accompanying claims.

What we claim, therefore, as new and useful is:

1. In a hook rule, a rule member having a corner rounded on an arc struck from a pivot point as a center, and a hook member pivotally mounted on said pivot point, said hook member having a flange which engages a side of the rule when open and protects the end thereof when closed.

2. In a hook rule, the combination of a rule member having a pivot member on one end thereof and a hook member mounted on said pivot, said hook member having a beak and a flange disposed on opposite sides of the hook member.

3. In a hook rule, a rule member having a rounded corner, a pivot point located on the center of a circle whose radius is that of a circle struck on the rounded corner, a hook member mounted on said pivot point, said hook member having a beak and a flange disposed on opposite sides thereof whereby said flange covers the end of the rule member when the hook member is in folded position.

4. In a hook rule, a rule member having markings and a rounded corner, a pivot point located on the center of a circle whose radius is that of a circle struck on the rounded corner, a hook member mounted on said pivot point, said hook member having a beak disposed on one side of the pivot point and a flange disposed on the other side thereof, said flange covering the end of the rule member when the hook member is in folded position, said beak having markings coinciding with the rule marks on the rule member when the hook member is folded.

CARL M. NICHOLSON.
EMIL ANDERSON.